United States Patent
Bruno et al.

(10) Patent No.: US 9,783,307 B2
(45) Date of Patent: Oct. 10, 2017

(54) ENVIRONMENTAL CONTROL SYSTEM UTILIZING CABIN DISCHARGE AIR TO POWER A CYCLE

(71) Applicant: Hamilton Sundstrand Corporation, Windsor Locks, CT (US)

(72) Inventors: Louis J. Bruno, Ellington, CT (US); Eric Surawski, Wethersfield, CT (US); Donald E. Army, Jr., Enfield, CT (US); Thomas M. Zywiak, Suffield, CT (US); Harold W. Hipsky, Willington, CT (US); Erin G. Kline, Vernon, CT (US); Richard Rusich, Ellington, CT (US); John M. Maljanian, Jr., Farmington, CT (US); Paul M. D'Orlando, Simsbury, CT (US)

(73) Assignee: HAMILTON SUNDSTRAND CORPORATION, Windsor Locks, CT (US)

( * ) Notice: Subject to any disclaimer, the term of this patent is extended or adjusted under 35 U.S.C. 154(b) by 147 days.

(21) Appl. No.: 14/695,537

(22) Filed: Apr. 24, 2015

(65) Prior Publication Data

US 2016/0311538 A1    Oct. 27, 2016

(51) Int. Cl.
    *B64D 13/06*    (2006.01)
(52) U.S. Cl.
    CPC ...... *B64D 13/06* (2013.01); *B64D 2013/0618* (2013.01); *B64D 2013/0648* (2013.01); *B64D 2013/0688* (2013.01); *Y02T 50/56* (2013.01)
(58) Field of Classification Search
    CPC ............ B64D 13/06; B64D 2013/0688; B64D 2013/0618; B64D 2013/0648; B64D 2013/0644; B64D 2013/0651; B64D 2041/002; B64D 2013/0677; B64D 2013/06; B64D 13/08; B64D 13/02;
    (Continued)

(56) References Cited

U.S. PATENT DOCUMENTS 4,262,495 A     4/1981 Gupta et al.
4,312,191 A *   1/1982 Biagini .................. B64D 13/06
                                                         62/172

(Continued)

FOREIGN PATENT DOCUMENTS

EP    1491443 A1    12/2004
EP    1884465 A2     2/2008
WO    03086859 A1   10/2003

OTHER PUBLICATIONS

EPSR for EP Application No. 16166828.0 Issued Oct. 21, 2016 10 pages.

*Primary Examiner* — Mohammad M Ali
(74) *Attorney, Agent, or Firm* — Cantor Colburn LLP

(57) ABSTRACT

A system and method that comprises an air cycle machine, a flow of bleed air, at least one heat exchanger, and an inlet configured to supply the flow of the bleed air is provided. The bleed air directly flows from a source to either a compressor of the air cycle machine or the at least one heat exchanger in accordance with a high pressure, low pressure, or pressure boost operation mode. The system and method also can also utilize recirculated air flowing from the chamber to drive or maintain the air cycle machine in accordance with the above modes.

7 Claims, 5 Drawing Sheets

(58) Field of Classification Search
CPC ....... Y02T 50/56; Y02T 50/44; Y02T 50/545;
Y10T 29/4962; Y10T 29/49826; Y10T
29/4935
USPC .................................................. 62/401, 402
See application file for complete search history.

(56) References Cited

U.S. PATENT DOCUMENTS

| | | | |
|---|---|---|---|
| 5,511,385 A * | 4/1996 | Drew | B64D 13/06 62/172 |
| 6,519,969 B2 | 2/2003 | Sauterleute | |
| 6,629,428 B1 | 10/2003 | Murry | |
| 6,883,335 B2 | 4/2005 | Axe et al. | |
| 7,322,202 B2 | 1/2008 | Zywiak et al. | |
| 7,607,318 B2 | 10/2009 | Lui et al. | |
| 7,797,962 B2 | 9/2010 | Kresser et al. | |
| 7,849,702 B2 | 12/2010 | Parikh | |
| 7,950,606 B2 | 5/2011 | Atkey et al. | |
| 7,970,497 B2 | 6/2011 | Derouineau et al. | |
| 8,099,973 B2 | 1/2012 | Sampson et al. | |
| 8,973,393 B2 | 3/2015 | Atkey et al. | |
| 9,151,539 B2 | 10/2015 | Army et al. | |
| 9,205,925 B2 | 12/2015 | Bruno et al. | |
| 2008/0022688 A1* | 1/2008 | Decrisantis | B64D 13/06 60/751 |
| 2008/0264084 A1 | 10/2008 | Derouineau et al. | |
| 2010/0064701 A1* | 3/2010 | Bruno | B64D 13/06 62/90 |
| 2012/0000205 A1* | 1/2012 | Coffinberry | B64D 13/06 60/806 |
| 2012/0285184 A1* | 11/2012 | Voinov | B64D 13/06 62/87 |
| 2014/0026588 A1* | 1/2014 | Velez | F02C 3/13 60/782 |
| 2014/0352348 A1* | 12/2014 | Army, Jr. | B64D 13/006 62/401 |
| 2015/0059397 A1 | 3/2015 | Bruno et al. | |
| 2015/0251765 A1 | 9/2015 | Jonqueres et al. | |
| 2015/0307183 A1 | 10/2015 | Bruno et al. | |
| 2015/0307196 A1 | 10/2015 | Bruno | |

* cited by examiner

US 9,783,307 B2

ENVIRONMENTAL CONTROL SYSTEM UTILIZING CABIN DISCHARGE AIR TO POWER A CYCLE

BACKGROUND OF THE INVENTION

In general, there is an overarching trend in the aerospace industry towards more efficient systems within an aircraft. With respect to present air conditioning systems of the aircraft, efficiency can be derived from utilizing proper engine bleed pressures based on environmental condition surroundings the aircraft.

For example, pressurized air from an engine of the aircraft is provided to a cabin through a series of systems that alters the temperature, humidity, and pressure of the pressurized air. To power this preparation of the pressurized air, the only source of energy is the pressure of the air itself. As a result, the present air conditioning systems have always required relatively high pressures at cruise. Unfortunately, in view of an overarching trend in the aerospace industry towards more efficient aircraft, the relatively high pressures provide limited efficiency with respect to engine fuel burn.

BRIEF DESCRIPTION OF THE INVENTION

According to one embodiment, an environmental control system, comprises an air cycle machine comprising a compressor; an inlet configured to supply a flow of bleed air directly to the compressor of the air cycle machine.

According to another embodiment, an environmental control system, comprises a secondary heat exchanger; an air cycle machine comprising a compressor; an inlet configured to supply a flow of bleed air directly to environmental control system; and a flow valve configured to: cause the flow of the bleed air to bypass the compressor and flow directly into the secondary heat exchanger or cause the flow of the bleed air to flow directly to the compressor.

According to another embodiment, an environmental control system comprises an air cycle machine an air cycle machine comprising a compressor and a turbine; a flow of bleed air; at least one heat exchanger; an inlet configured to supply the flow of the bleed air directly to the compressor, wherein the environmental control system is operating in a pressure boost mode, wherein the turbine is configured to receive recirculated air from a chamber of the environmental control system, wherein as the recirculated air is expanding across the turbine, work is extracted by the air cycle machine to compress the bleed air via the compressor.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION OF THE INVENTION

A detailed description of one or more embodiments of the disclosed apparatus and method are presented herein by way of exemplification and not limitation with reference to the Figures.

As indicated above, the relatively high pressures provide limited efficiency with respect to engine fuel burn. Thus, what is needed is an environmental control system, which eliminates a primary heat exchanger and uses cabin discharge air to power the cycle at altitude, to provide cabin pressurization and cooling at high engine fuel burn efficiency.

In general, embodiments of the present invention disclosed herein may include a system and/or method (herein system) comprising an environmental control system, which excludes a heat exchanger between an engine and an air cycle machine to create the lowest pressure drop path possible. The environmental control system provides a new approach to cabin air conditioning that, for example, can operate at pressures as low as 2.5 psi below the cabin pressure.

Figure 1:
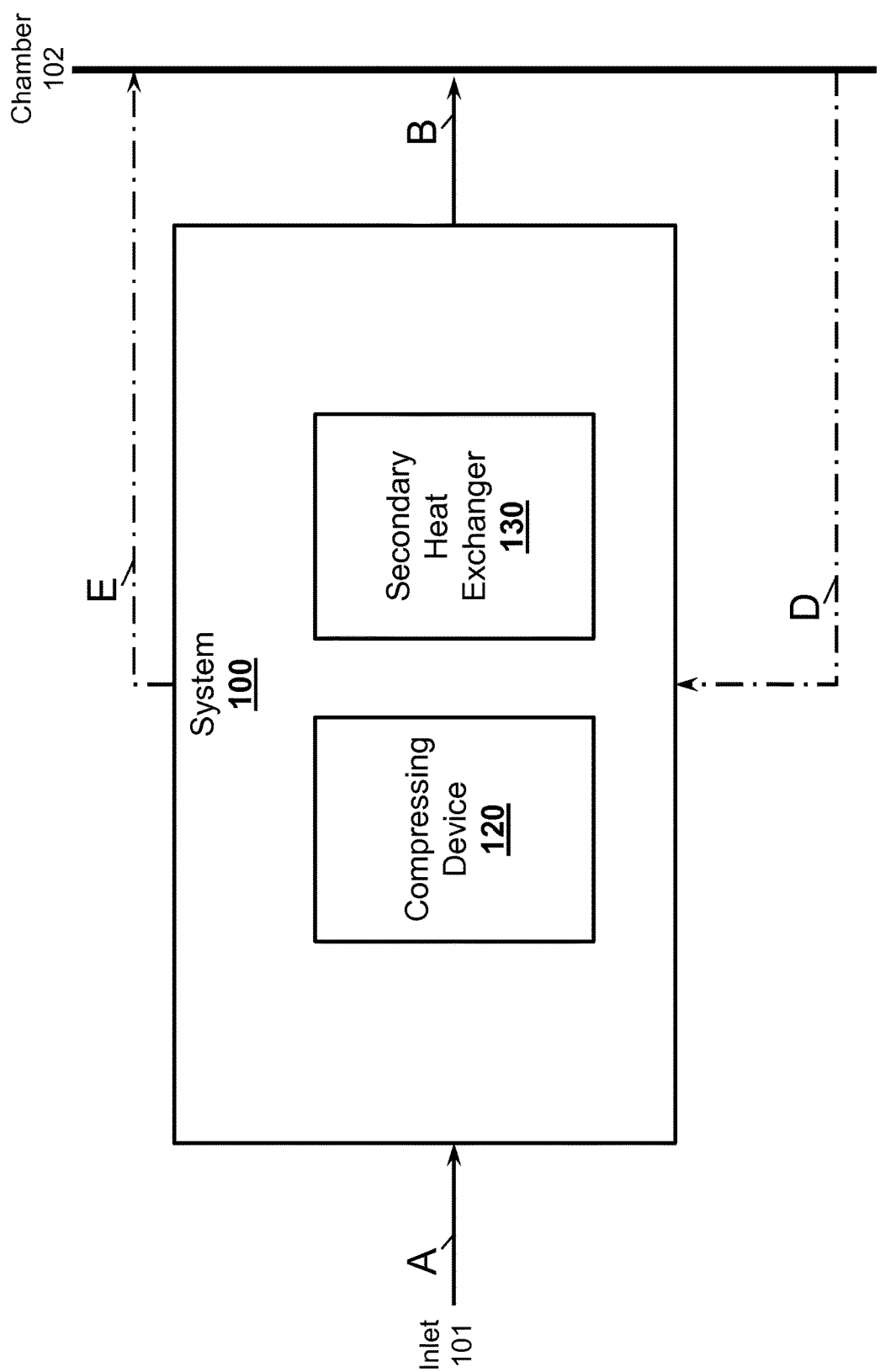
FIG. 1 depicts a schematic of a system according to an embodiment.

FIG. 1 illustrates a medium (e.g., air) flowing through a system 100 from an inlet 101 to a chamber 102, as indicated by solid-lined arrows A, B. In the system 100, the medium can flow from the inlet 101 to a compressing device 120, from the compressing device 120 to a secondary heat exchanger 130, and from the secondary heat exchanger 130 to the chamber 102. Further, the medium recirculates from chamber 102 through the system 100 and back to the chamber 102 (and/or external to the system 100), as indicated by the dot-dashed lined arrows D, E.

In one embodiment, the system 100 can be any environmental control system of a vehicle, such as an aircraft or watercraft, that provides air supply, thermal control, and cabin pressurization for a crew and passengers of the vehicle (e.g., a cabin air conditioning system of an aircraft). The system may also include avionics cooling, smoke detection, and fire suppression. For example, on an aircraft, air is supplied to the environmental control system by being "bled" from a compressor stage of a turbine engine. The temperature, humidity, and pressure of this "bleed air" varies widely depending upon a compressor stage and a revolutions per minute of the turbine engine. To achieve the desired temperature, the bleed-air is cooled as it is passed through at least one heat exchanger (e.g., exchanger 130). To achieve the desired pressure, the bleed-air is compressed as it is passed through a compressing device (e.g., compressing device 120). The interaction of the environmental control system with the engine influences how much fuel burn by the engine is needed to perform operations, such as supplying pressurized air, related to that interaction.

Heat exchangers (e.g., a secondary heat exchanger 130) are equipment built for efficient heat transfer from one medium to another. Examples of heat exchangers include double pipe, shell and tube, plate, plate and shell, adiabatic wheel, plate fin, pillow plate, and fluid heat exchangers. Continuing with the aircraft example above, air forced by a fan (e.g., via push or pull methods) is blown across the heat exchanger at a variable cooling airflow to control the final air temperature of the bleed-air.

The compressing device 120 (e.g., an air cycle machine as described below) is a mechanical device that controls/regulates a pressure of a medium (e.g., increasing the pressure of a gas). Examples of a compressor include centrifugal, diagonal or mixed-flow, axial-flow, reciprocating, ionic liquid piston, rotary screw, rotary vane, scroll, diaphragm, air bubble compressors. Further, compressors are typically driven by an electric motor or a steam or a gas turbine.

Note that the system 100 of FIG. 1 is in contrast to a conventional cabin air conditioning system that includes a traditional cabin three-wheel air conditioning system. In the conventional cabin air conditioning system, high pressure air from, for example, an engine passes through in series a first ram air heat exchanger, an air cycle machine, a second ram air heat exchanger, and a high pressure water separator where the air is cooled and dehumidified, such that the resulting cold dry air is used to cool the cabin, flight deck, and other airplane systems. In operation, high-pressure high-temperature air from either engine enters the first heat exchanger and is cooled by ram air. This warm high pressure air then enters the ACM compressor. The compressor further pressurizes the air and in the process heats it. The air then enters the second heat exchanger and is cooled by ram air to approximately ambient temperature. This cool high pressure air enters the high pressure water separator where the air goes through the reheater, where it is cooled; the condenser, where it is cooled by air from the ACM turbine; the water extractor, where the moisture in the air is removed; and the reheater, where the air is heated back to nearly the same temperature it started at when it entered the high pressure water separator. The warm high pressure and now dry air enters the turbine, where it is expanded and work extracted. The work from the turbine, drives both the before mentioned compressor and a fan that is used to pull ram air flow through the first and second heat exchangers. After leaving the turbine, the cold air, typically below freezing, cools the warm moist air in the condenser and is then sent to condition the cabin and flight deck.

Figure 2:
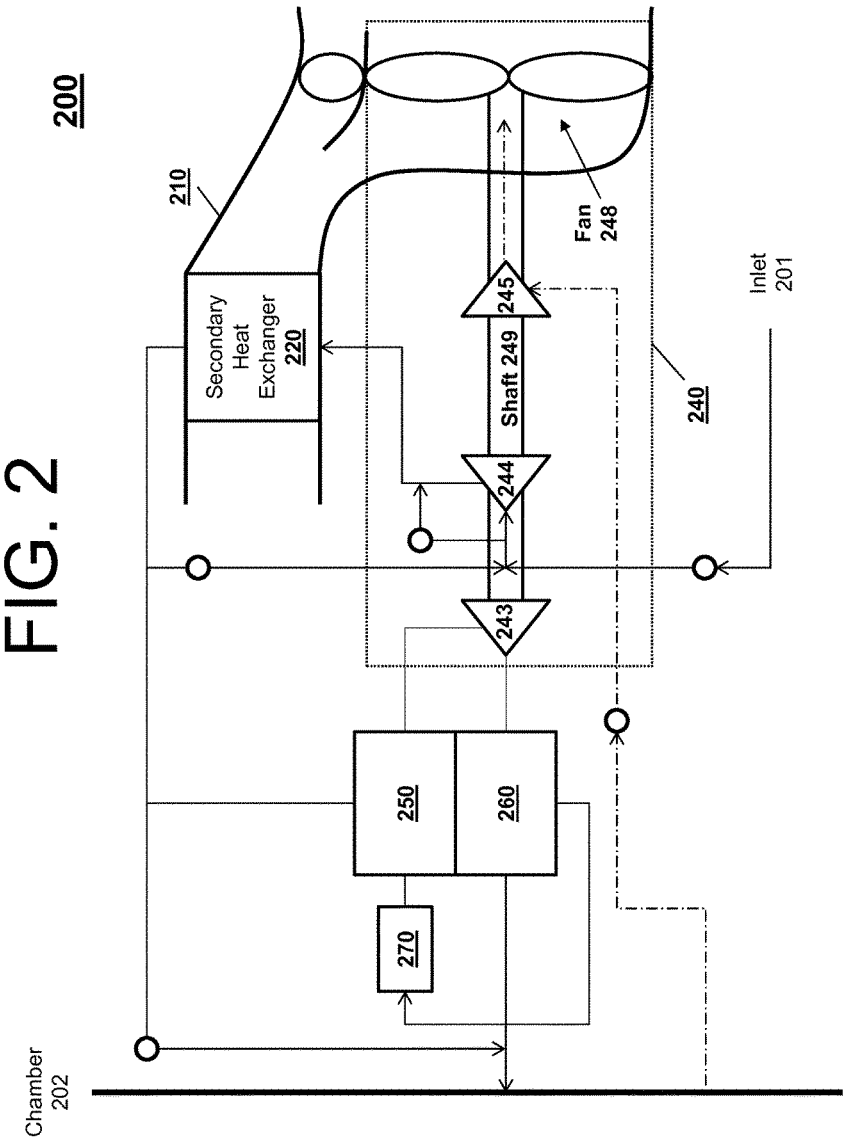
FIG. 2 depicts another schematic of a system according to an embodiment.

The system 100 of FIG. 1 will now be described with reference to FIGS. 2-5, in view of the aircraft example above. FIG. 2 depicts a schematic of a system 200 (e.g., an embodiment of system 100) as it could be installed on an aircraft. The system 200 illustrates bleed air flowing in at inlet 201 (e.g., off an engine of an aircraft at an initial flow rate, pressure, temperature, and humidity), which in turn is provided to a chamber 202 (e.g., cabin, flight deck, etc.) at a final flow rate, pressure, temperature, and humidity. Then the bleed air can recirculate back through the system 200 from the chamber 202 (herein recirculated air and represented by the dot-dashed line) to drive the system 200. The system in includes a shell 210 for receiving and directing ram air through the system 200.

The system 200 further illustrates a secondary heat exchanger, 220, an air cycle machine 240 (that includes a turbine 243, a compressor 244, a turbine 245, a fan 248, and a shaft 249), a reheater 250, a condenser 260, and a water extractor 270, each of which is connected via tubes, pipes, and the like. Note that based on the embodiment, an exhaust from the system 200 can be sent to an outlet (e.g., releases to ambient air).

The system 200 is an example of an environmental control system of an aircraft that provides air supply, thermal control, and cabin pressurization for the crew and passengers of the aircraft. Valves are devices that regulate, direct, and/or control a flow of a medium (e.g., gases, liquids, fluidized solids, or slurries, such as bleed-air) by opening, closing, or partially obstructing various passageways within the tubes, pipes, etc. of the environmental control system 200. Valves can be operated by actuators, such that the flow rates of any medium in any portion of the environmental control system 200 may be regulated to a desired value. A secondary heat exchanger 220 is an example of a heat exchanger as described above.

The air cycle machine 240 (e.g., the compressing device 120), which includes a turbine 243, compressor 244, another turbine 245, a fan 248, and a shaft 249, controls/regulates a temperature, a humidity, and a pressure of a medium (e.g., increasing the pressure of a bleed air). The compressor 244 is a mechanical device that raises the pressure of the bleed-air received from the first heat exchanger. The turbines 243, 245 are mechanical devices that drive the compressor 244 and the fan 248 via the shaft 249. The fan 248 is a mechanical device that can force via push or pull methods air through the shell 210 across the secondary heat exchanger 220 at a variable cooling airflow. Thus, the turbines 243, 245, the compressor 244, and the fan 248 together illustrate, for example, that the air cycle machine 240 may operate as a four-wheel air cycle machine that utilizes air recirculated from the chamber 202.

The reheater 250 and the condenser 260 are particular types of heat exchanger. The water extractor 270 is a mechanical device that performs a process of taking water from any source, such as bleed-air, either temporarily or permanently. Together, reheater 250, the condenser 260, and/or the water extractor 270 can combine to be a high pressure water separator.

Note that in the environmental control system 200 of FIG. 2 there is no 'primary' heat exchanger. In this way, the environmental control system 200 shows a new approach to cabin air conditioning (e.g., chamber 202) that can operate at relatively low pressures compared to conventional systems (e.g., operate at 2.5 psi below a cabin pressure). That is, the environmental control system 200 eliminates the 'primary' heat exchanger and utilizes recirculated air from the chamber 202 (e.g., uses cabin discharge air) to power the air cycle machine 240 at altitude. In turn, when the environmental control system 200 is combined with a three port bleed system, the direct path between the engine and the air cycle machine creates a lowest pressure drop path possible.

The arrows of FIG. 2 illustrate all the possible paths that the bleed air and the recirculated air may flow through the environmental control system 200, as directed by the valves. Embodiments of depicting different combinations of flow paths will now be described with respect to FIGS. 3-5.

Figure 3:
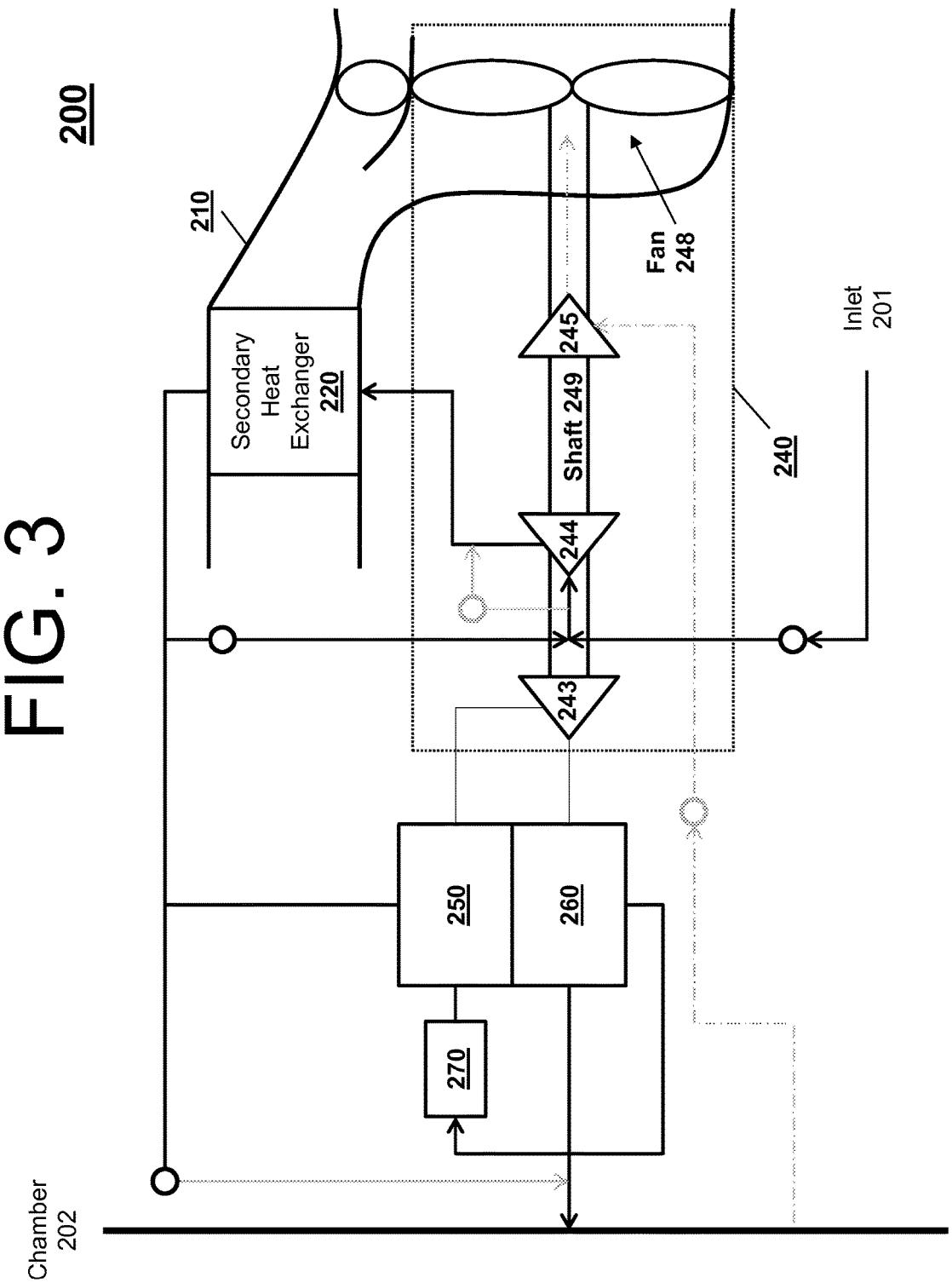
FIG. 3 depicts a high pressure mode schematic of a system aircraft according to an embodiment.

FIG. 3 depicts a schematic of a system 200 operating in the high pressure mode (e.g., an operational embodiment of the system 200 of FIG. 2). The flow of bleed air is illustrated as solid arrows flowing through the system 200 from inlet 201 to chamber 202. The flow of recirculated air is illustrated as dot-dashed arrows flowing from the chamber 202 through the system 200. This mode of operation can be used at flight conditions when a pressure of air from a source (e.g., an engine and/or the APU) is adequate to drive a cycle of the system 200 or when a chamber 202 temperature demands it. For example, conditions such as ground idle, taxi, take-off, climb, descent, hold, and like conditions would have the air cycle machine 240 operating in a high pressure mode. Further, extreme temperature high altitude cruise conditions could result in one or of the more air cycle machines 240 operating in this mode, and/or two or more air cycle machines 240 per system operating in different modes.

In operation, high-pressure high-temperature air from a source (e.g., an engine and/or the APU) flows from the inlet 201 and enters the compressor 244. The compressor 244 further pressurizes the air and in the process heats it. The air then enters the secondary heat exchanger 220 and is cooled by ram air of the shell 210 to approximately an ambient temperature. This cool high pressure air exits the secondary heat exchanger 220 and enters the high pressure water separator.

Note that the air directly enters the compressor 244 from the source via the inlet 201. It should be understood that directly means from the inlet 201 to compressor 244 without traveling through a component configured to alter the temperature of the flow. Flow through valves, past sensors, and through flow measuring devices is contemplated by the term directly. From the source, the air may be at a temperature at or over the predetermined temperature (e.g., 300, 350, 400, 450, etc. degrees Fahrenheit). Further, when the air is compressed by the compressor 244, the temperature is raised over the predetermined temperature limit. Thus, the flow of system 200 includes a quench loop between the compressor 244 and the secondary heat exchanger 220. The quench loop utilizes the air cooled by the ram air of the shell 210 to join with and cool the air from the source, such that a temperature of the air at a discharge is below a predetermined temperature limit.

In the high pressure water separator, the air goes through the reheater 250, where it is cooled; the condenser 260, where it is cooled by air from the turbine 243 the air cycle machine 240; a water extractor 270, where the moisture in the air is removed; and the reheater 250, where the air is heated back to nearly the same temperature it started at when it entered the high pressure water separator. The warm high pressure and now dry air enters the turbine 243, where it is expanded so that work can be extracted. The work from the turbine 243 can drive both the before mentioned compressor 244 and a fan 248 that can be used to pull ram air flow through the shell 210 and across the secondary heat exchanger 220. After leaving the turbine 243, the air is cold, such as below freezing. This cold air is utilized to cool the warm moist air in the condenser 260 before being sent to the chamber 202 (e.g., to condition a cabin and a flight deck of the aircraft).

Note that, in extreme temperature high altitude cruise conditions (e.g., when the aircraft is at cruise, such as above 30,000 or 40,000 feet), the air may upon exiting the secondary heat exchanger 220 bypass the high pressure water separator and directly enter the chamber 202. In this case, the recirculated air from the chamber may be utilized to drive the turbine 245 and prevent the air cycle machine 240 from freewheeling (i.e., turning below a minimum speed, such as 3,000, 3,500, 4,000, 4,500, 5,000, 5,500, 6,000, etc. revolutions per minute). That is, the recirculated air is taken from the chamber 202, expanded across the turbine 245, and dumped into the shell 210 based on a pressure ratio between ambient air of the shell 210 and the recirculated air.

Figure 4:
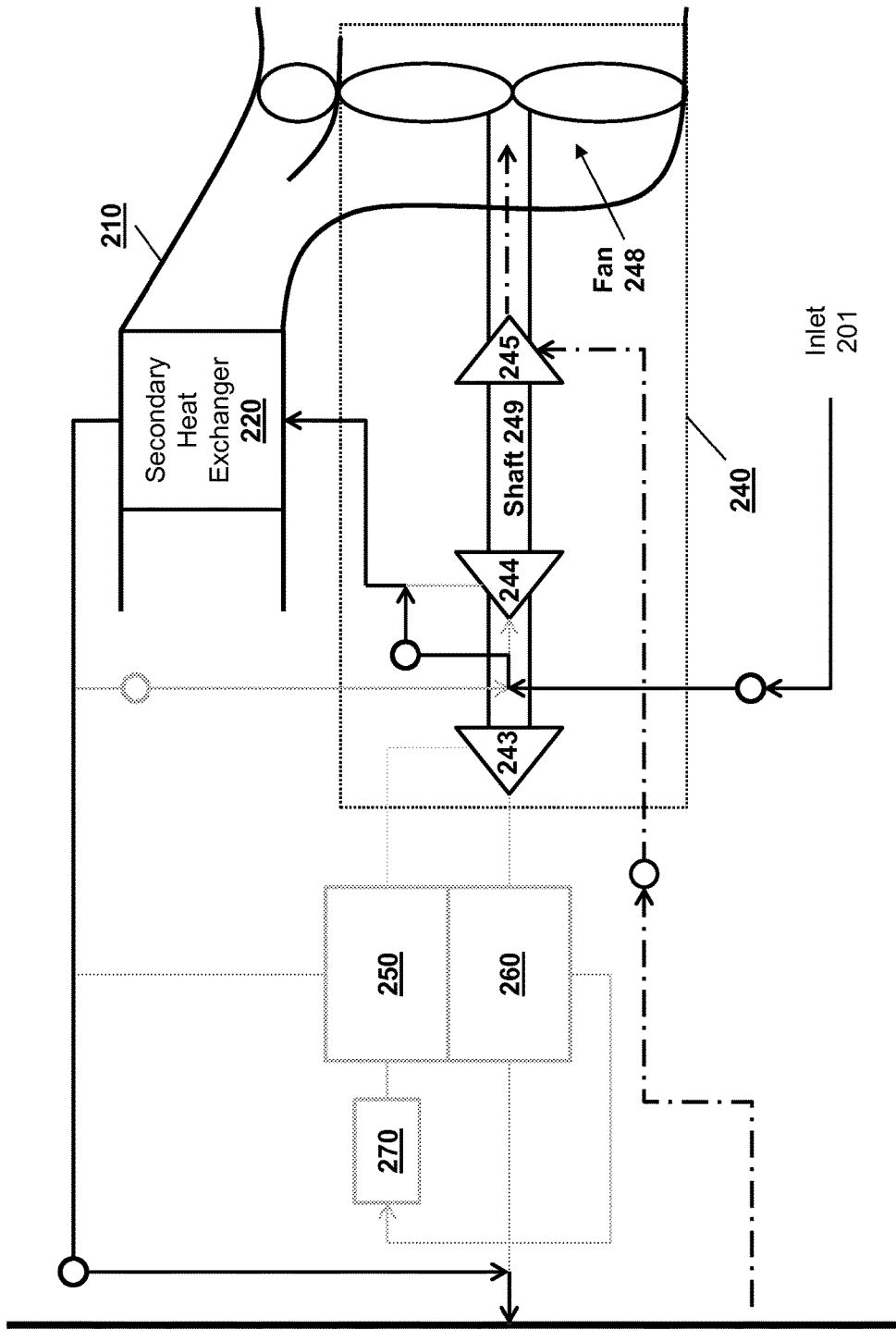
FIG. 4 depicts a low pressure mode schematic of a system aircraft according to an embodiment.

FIG. 4 depicts a schematic of a system 200 operating in the low pressure mode (e.g., another operational embodiment of the system 200 of FIG. 2) at cruise. The flow of bleed air is illustrated as solid arrows flowing through the system 200 from inlet 201 to chamber 202. The flow of recirculated air is illustrated as dot-dashed arrows flowing from the chamber 202 through the system 200. This mode of operation can be used at flight conditions when a pressure of the air from the source is adequate to drive a cycle (e.g., drive the air cycle machine 240) of the system 200 or when a chamber temperature demands it. This mode of operation would be used at flight conditions where a pressure of the air from a source (e.g., an engine and/or the APU) enters the air cycle machine 240 at or approximately at 1 psi above a pressure of the chamber 202. For example, the mode may be utilized in such conditions as when the aircraft is at cruise (e.g., at altitudes above 30,000 or 40,000 feet) and at or near standard ambient day types.

In operation, the air from the source via the inlet 201 bypasses due to a flow valve the air cycle machine 240 entirely and directly enters the secondary heat exchanger 220, which cools the air based on the ram air in the shell 210 to a temperature needed by the chamber 202. This cooled air then goes directly into the chamber 202. In this case, the air cycle machine 240 may need to remain turning so as to prevent windmilling. Thus, in one example, the recirculated air is used to keep the air cycle machine 240 turning at or above the minimum speed via the use of a regulated valve. Other examples of mechanism that prevent windmilling include an electric fan, a break, a fan bypass, etc.

Figure 5:
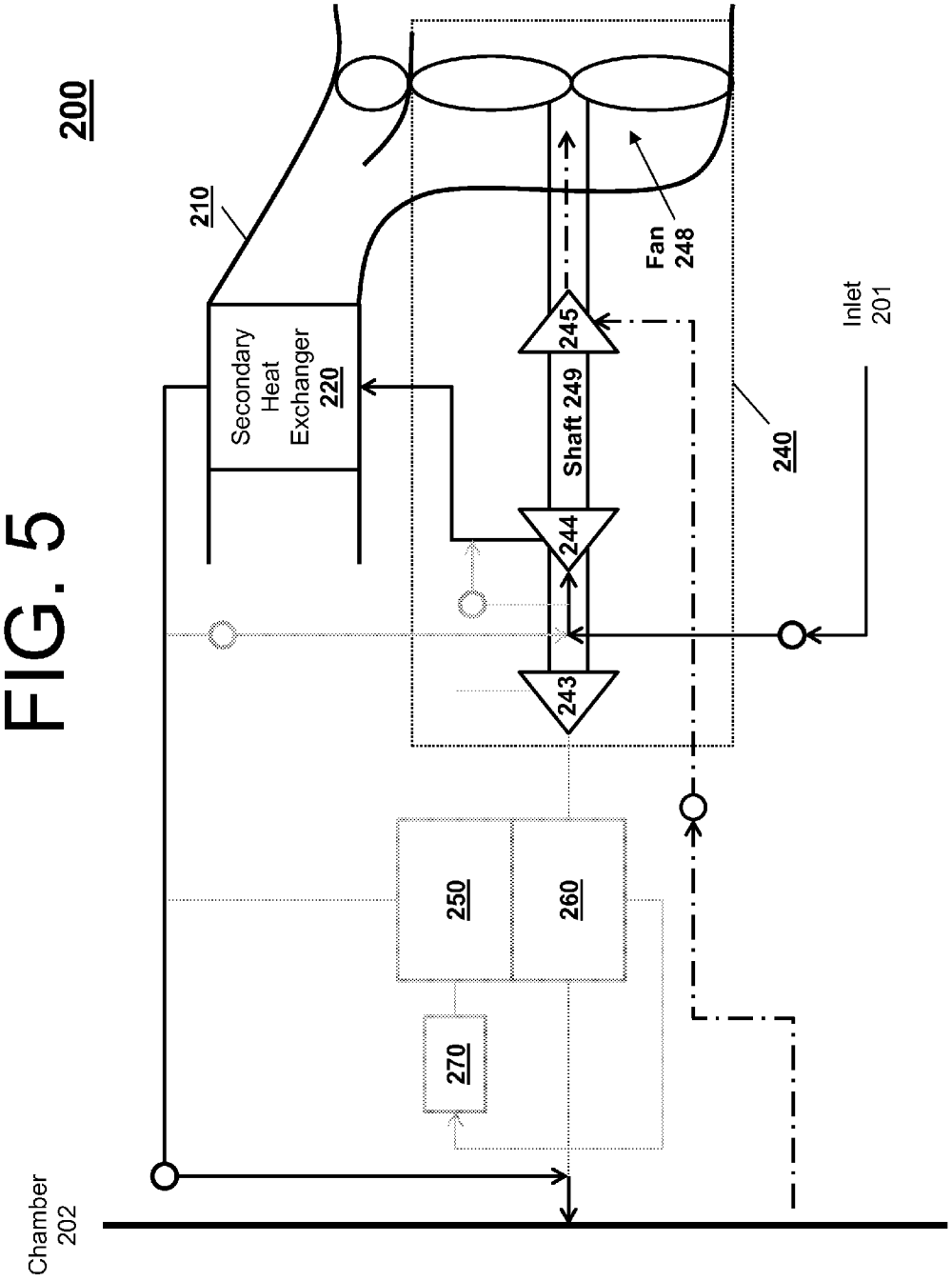
FIG. 5 depicts a boost pressure mode schematic of a system aircraft according to an embodiment.

FIG. 5 depicts a schematic of a system 200 operating in the pressure boost mode (e.g., another operational embodiment of the system 200 of FIG. 2). The flow of bleed air is illustrated as solid arrows flowing through the system 200 from inlet 201 to chamber 202. The flow of recirculated air is illustrated as dot-dashed arrows flowing from the chamber 202 through the system 200. This mode of operation can be used at flight conditions when a pressure of the air from the source and entering the air cycle machine 240 is lower than a pressure of the chamber 202 (e.g., at or below 1, 1.5, 2, 2.5, 3, 3.5, etc. pounds per square inch). For example, the mode may be utilized in such conditions as when the aircraft is at cruise (e.g., at altitudes above 30,000 or 40,000 feet) and at or near standard ambient day types.

In operation, the air from the source enters the compressor 244 and is compressed and heated. This pressurized warm air then enters the secondary heat exchanger 220 and is cooled by ram air of the shell 210 to a temperature desired for the chamber 202. The air then goes directly into the chamber 202.

Further, the recirculated air is used to provide energy to pressurize the bleed air. That is, the recirculated air enters and expands across the turbine 245, so that and work is extracted. This work is enough to turn the air cycle machine 240 at a speed required by the compressor 244 to raise a pressure of the bleed air from the source via inlet 201 to a pressure that enables the bleed air to get through the secondary heat exchanger 220 and into the chamber 202. Note that the recirculated air exiting the turbine 245 is then dumped overboard through the shell 210.

The technical effects and benefits of embodiments of the present invention include providing an air cycle machine compressor that is efficient in the pressure boost mode and the high pressure mode. In a high pressure mode, when operating off the engine, the system has a quench flow recirculating from the secondary heat exchanger outlet to the compressor inlet. Also, in the high pressure mode when operating off the APU, the system is going to desire a lower pressure APU pressure and higher APU flow, which requires changes to the APU load compressor. In both of these cases, there is a higher flow through the compressor at high temperature (e.g., than a conventional system) to align the compressor operating points and achieve better efficiency in the pressure boosting mode.

Aspects of the present invention are described herein with reference to flowchart illustrations, schematics, and/or block diagrams of methods, apparatus, and/or systems according to embodiments of the invention. Further, the descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. An environmental control system, comprising:
   an air cycle machine comprising a compressor, a shaft, and a turbine;
   an inlet configured to receive a flow of bleed air from an engine;
   a flow path between the inlet and the compressor that supplies the flow of the bleed air directly to the compressor of the air cycle machine to provide a lowest possible pressure drop for the bleed air;
   a heat exchanger;
   a high pressure water separator configured to condition the bleed air before the bleed air is passed to a chamber; and
   a quench loop connecting an exhaust of the heat exchanger to the flow path,
   wherein the quench loop is configured to reduce an energy of the bleed air before the bleed air directly enters the compressor,
   wherein the turbine of the air cycle machine configured to receive the conditioned bleed air from the high pressure water separator,
   wherein when a flow valve on the flow path causes the flow of the bleed air to flow directly to the compressor, recirculated air expands across the turbine based on an energy ratio to turn the shaft to provide energy to drive the compressor.

2. The environmental control system of claim 1, further comprises:
   the flow valve configured to alter the flow path to cause the flow of the bleed air to bypass the compressor and flow directly into the heat exchanger.

3. The environmental control system of claim 1, wherein the environmental control system is included within an aircraft.

4. An environmental control system, comprising:
   a heat exchanger;
   an air cycle machine comprising a compressor, a shaft, and a turbine;
   an inlet configured to receive a flow of bleed air from an engine;
   a flow path between the inlet and the compressor that supplies the flow of the bleed air directly to the compressor of the air cycle machine to provide a lowest possible pressure drop for the bleed air;
   a flow valve on the flow path configured to alter the flow path from connecting directly to the compressor to bypassing the compressor and connecting directly to the heat exchanger;
   a high pressure water separator configured to condition the bleed air before the bleed air is passed to a chamber; and
   a quench loop connecting an exhaust of the heat exchanger to the flow path,
   wherein the quench loop is configured to reduce an energy of the bleed air before the bleed air directly enters the compressor,
   wherein the turbine of the air cycle machine configured to receive the conditioned bleed air from the high pressure water separator,
   wherein when the flow valve causes the flow of the bleed air to flow directly to the compressor, recirculated air expands across the turbine based on an energy ratio to turn the shaft to provide energy to drive the compressor.

5. The environmental control system of claim 4, wherein the air cycle machine comprises a turbine, and
   wherein recirculated air expands across the turbine based on an energy ratio to turn a shaft of the air cycle machine.

6. The environmental control system of claim 4, further comprises:
   a second flow valve configured to cause the flow of air exiting the heat exchanger to flow directly to the chamber.

7. The environmental control system of claim 4, wherein the environmental control system is included within an aircraft.

* * * * *